W. F. SHORE.
GAGE.
APPLICATION FILED APR. 26, 1911.

1,042,721.

Patented Oct. 29, 1912.

WITNESSES:

INVENTOR
William F. Shore,
BY
Geo. A. Hoffman.
ATTORNEY

UNITED STATES PATENT OFFICE.

WILLIAM F. SHORE, OF NEW YORK, N. Y.

GAGE.

1,042,721.  Specification of Letters Patent.  Patented Oct. 29, 1912.

Application filed April 26, 1911. Serial No. 623,417.

*To all whom it may concern:*

Be it known that I, WILLIAM F. SHORE, a citizen of the United States, residing at New York, in the county of New York and State of New York, have invented certain new and useful Improvements in Gages, of which the following is a full, clear, and exact specification.

This invention relates to gages, designed specially for testing rubber or other resilient substances for determining their yielding and resilient qualities, soundness, elasticity, &c., although, of course, the invention may be used in measuring or testing other more or less yielding substances or materials.

The objects of the invention are to produce a novel, useful, simple and practical device, adapted to be manufactured at a low cost and of an appropriate size and design so as to be easily carried about.

Other objects will appear as this specification proceeds.

This invention comprises such parts and combinations as are hereinafter set forth, while reference is had to the accompanying drawings, in which—

Figure 1:
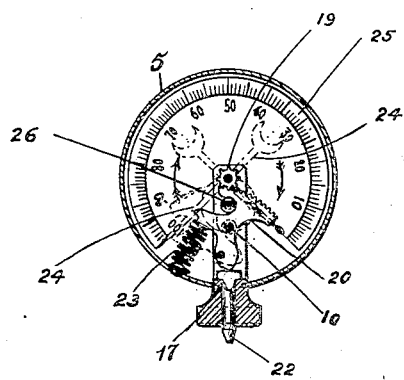
Figure 2:
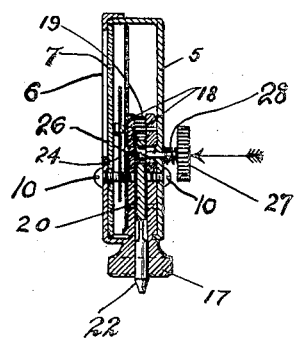

Figure 1 is a front elevation, partly in section, of a gage embodying my invention, with the cover removed; and Fig. 2 is a vertical sectional view of the gage shown in Fig. 1.

Referring to the drawings, 5 represents a circular casing and 6 a cover therefor, having an opening protected by a glass or celluloid cover 7, through which a scale may be observed. A bearing block 17 is extended inwardly beyond the center of the casing 5 and is slotted at 18 for the reception of the pinion 19 and a toothed rocker 20, which latter is pivoted to one side of the axial line to the bearing block 17. The bearing block 17 is held in place between the cover 6 and the circular casing 5 by means of screws 10, 10, one of which constitutes the pivot for said rocker.

22 is a measuring pin for operating the rocker 20 against the resistance of the spring 23.
When the measuring pin is pushed inwardly, the rocker 20 is oscillated, which, in turn, rotates the pinion 19 to operate the pointer 24 and which pointer registers on the scale 25.
In this construction, the scale may be made many times longer, without increasing the size of the instrument, than it is possible to do when no means is employed for multiplying this movement. The gage shown in this construction is also provided with a locking pin having a shank 26, a thumb piece or knob 27 and a spring 28—located between the thumb piece and the back of the covering on the bottom of the casing, for holding the locking pin out of normal engagement with the rocker 20.

When it is desired to ascertain and measure the recovering and resilient qualities of the rubber or other substance, the locking pin is pushed inwardly against the resistance of the spring 28 until said pin abuts the rocker 20 and thus prevents said rocker from oscillating when the pin 22 is pressed or forced into the rubber or other substance to be measured, to its full exposed length. It will be understood, however, that the pin 22 does not penetrate or cut into the rubber or other substance. When said pin 22 has been thus pressed into the rubber or other substance, the locking pin above described is released and as the substance regains its normal or original form it pushes the pin 22 inwardly in the gage, thereby oscillating the rocker 20, which rotates the pinion 19 and which pinion, in turn, causes the indicator 24 to register on the scale 25, and in this way the recovering tendency or resilient qualities of the rubber or other substance tested is registered in degrees on said scale 25, as explained. In this instance, however, the spring 23 is one of less resistance than the spring would be if the gage were used merely for testing or measuring the yielding qualities of the rubber or other substance, and, likewise, the pin 22 may be more pointed than a pin used in a gage for measuring the yielding qualities of the substance, as above stated.

It will also be understood that I do not limit myself to the exact construction and arrangement of parts shown in the drawings and described in the specification, as it is obvious that various changes and modifications may be made and different materials used, without departing from the spirit and scope of my invention.

Having thus described my invention, what I claim as new and desire to secure by Letters Patent, is:

1. In a gage of the character described, the combination of a circular casing, a cover for the same having an opening protected by a glass or celluloid covering, a bearing block inserted within said casing and projecting in a radial direction within the same, said bearing block being provided with a slot, a measuring pin projecting into said slot, a pointer, a toothed rocker and a pinion engaging said toothed rocker for operating said pointer by an inward movement of the said measuring pin, substantially as shown and described.

2. In a gage of the character described, the combination of a circular casing and a cover therefor, a measuring pin located partly within and partly without the gage, a pointer, means embodying a rocker for transmitting movement of the measuring pin to the pointer, and locking means normally out of engagement with said rocker for preventing movement of the rocker and pointer.

3. In a gage of the character described, the combination of a circular casing and a cover therefor, a bearing block in said casing and projecting in a radial direction within the same, said bearing block being provided with a slot, a measuring pin projecting into said slot, a pointer, a toothed rocker, a locking pin provided with means for keeping said pin out of normal engagement with said rocker, and a pinion engaging said toothed rocker for operating said pointer by an inward movement of the said measuring pin, substantially as shown and described.

4. In a gage of the character described, the combination of a circular casing and a cover therefor, a bearing block in said casing and projecting in a radial direction within the same, said bearing block being provided with a slot, a measuring pin projecting into said slot, a pointer, a toothed rocker provided with a spring for keeping said rocker in its normal position, a manually-operated locking pin adapted to abut said toothed rocker for preventing said rocker from oscillating, and a pinion engaging said toothed rocker for operating said pointer by an inward movement of said measuring pin when said locking pin is released, substantially as shown and described.

In testimony whereof, I affix my signature, in presence of two witnesses.

WILLIAM F. SHORE.

Witnesses:
IRWIN KURTZ,
JOSEPH KLEINER.